United States Patent
Allen (10) Patent No.: US 8,690,237 B2
(45) Date of Patent: Apr. 8, 2014

(54) CHILD CAR SEAT AND HEADREST WITH SIDE IMPACT ENERGY ABSORPTION

(75) Inventor: Brian Allen, Fort Mill, SC (US)

(73) Assignee: Graco Children's Products Inc., Atlanta, GA (US)

( * ) Notice: Subject to any disclaimer, the term of this patent is extended or adjusted under 35 U.S.C. 154(b) by 0 days.

(21) Appl. No.: 13/601,522

(22) Filed: Aug. 31, 2012

(65) Prior Publication Data

US 2013/0328368 A1 Dec. 12, 2013

Related U.S. Application Data

(60) Provisional application No. 61/656,852, filed on Jun. 7, 2012.

(51) Int. Cl.
*B60N 2/28* (2006.01)

(52) U.S. Cl.
USPC .................................................. 297/216.11

(58) Field of Classification Search
USPC ............... 297/250.1, 219.12, 452.46, 452.47, 297/452.42, 452.43, 216.11, 410, 452.41
See application file for complete search history.

(56) References Cited

U.S. PATENT DOCUMENTS

| | | | | |
|---|---|---|---|---|
| 4,607,885 A * | 8/1986 | del Fierro | ...................... | 297/397 |
| 5,088,478 A | 2/1992 | Grim | | |
| 5,385,385 A | 1/1995 | Silverman | | |
| 5,669,665 A | 9/1997 | Nowak | | |
| 5,779,320 A * | 7/1998 | Corrales | ........................ | 297/487 |
| 6,234,578 B1 * | 5/2001 | Barton et al. | ............. | 297/452.41 |
| 6,247,751 B1 * | 6/2001 | Faust et al. | ............... | 297/180.13 |
| 6,682,128 B2 | 1/2004 | Carroll, III et al. | | |
| 6,817,675 B2 * | 11/2004 | Buss et al. | ................. | 297/452.6 |
| 6,976,685 B1 * | 12/2005 | King et al. | ....................... | 280/30 |
| 7,055,903 B2 * | 6/2006 | Balensiefer et al. | ..... | 297/256.11 |
| 7,234,771 B2 | 6/2007 | Nakhla | | |
| 7,717,506 B2 | 5/2010 | Amesar et al. | | |
| 7,726,734 B2 | 6/2010 | Mahal et al. | | |
| 7,744,154 B2 | 6/2010 | Marsden et al. | | |
| 2006/0267386 A1 | 11/2006 | Nakhla et al. | | |
| 2007/0216203 A1 | 9/2007 | Rajasingham | | |
| 2009/0091166 A1 | 4/2009 | Jha | | |
| 2010/0231012 A1 | 9/2010 | Marsden et al. | | |
| 2011/0012406 A1 * | 1/2011 | Gibson et al. | ............. | 297/250.1 |
| 2011/0169319 A1 * | 7/2011 | Demontis et al. | ........ | 297/452.46 |

OTHER PUBLICATIONS

Press Release, "Dorel Juvenile Group Introduces Ground Breaking Car Seat Safety Technology Air, Protect to Launch in New Safety 1st Car Seat;" Jun. 29, 2009.
"True Side Impact Protection;" Product Information; Britax; 2012.
"Symphony DLX All in One Car Seat;" Product Information; Evenflo; 2012.

* cited by examiner

*Primary Examiner* — Milton Nelson, Jr.
(74) *Attorney, Agent, or Firm* — Lempia Summerfield Katz LLC (57) ABSTRACT

A child car seat has a substantially rigid seat shell with a seating surface side and configured with a seat bottom section, a seat back section, and two side wings laterally spaced apart and protruding forward relative to an upper region of the seat back section. A support layer of substantially rigid foam material is positioned over at least the seating surface side of the side wings. A body of compressible resilient foam material is adjacent the support layer on at least the side wings. The body has an outer surface that is substantially sealed. One or more air passages are in fluid communication between an interior within the outer surface of the body and the atmosphere.

18 Claims, 6 Drawing Sheets

CHILD CAR SEAT AND HEADREST WITH SIDE IMPACT ENERGY ABSORPTION

RELATED APPLICATION DATA

This patent is related to and claims priority benefit of U.S. provisional application Ser. No. 61/656,852 filed on Jun. 7, 2012 and entitled "Child Car Seat and Headrest with Side Impact Energy Absorption." The entire content of this prior filed provisional application is hereby incorporated herein by reference.

BACKGROUND

1. Field of the Disclosure

The present disclosure is generally directed to child car seats or safety seats, and more particularly to a child car seat with side impact protection zones.

2. Description of Related Art

Child car seats and safety seats known in the art and are intended to help protect a child that is seated in the seat during a crash of the vehicle. Such car seats typically do so by restraining the child in the seat during the crash. Some car seats also absorb some of the energy of the impact to further protect or insulate the child.

Side impact crashes can be particularly problematic for all vehicle occupants, including for children seated in a child car seat or safety seat. During a side impact crash, the child's head can move violently sideways, which may cause their head to impact with the sides or side wings of the car seat. Some child car seats have attempted to address this problem by employing pads or additional cushioning in these side impact zones of the seat.

Dorel/Cosco has offered for sale a child car seat with what they call the AIRPROTECT feature. This feature includes an air bladder structure added to each side wing of the seat. The air bladders function similar to a whoopee cushion in that, upon impact, air will escape the interior of the air bladders in a relatively controlled manner The air flow is controlled so as to slow the deflation of the air bladder during an impact. The AIRPROTECT product structure has enclosed urethane foam inside the ported air bladders to absorb energy. However, when a large or great impact force is applied, the air bladder and foam bottom out against the hard plastic or other surface of the seat shell or headrest shell. This may cause an undesirable sudden deceleration of the child's head and potentially increase the risk of injury to the child.

EVENFLO has provided children's car seats with what they call "E3 Technology" to address side impact issues. The "E3 Technology" is said to expand the surface area of the impact zones on the car seat for better protection. The "E3 Technology" is also said to incorporate a three-layer foam material to absorb impact forces more efficiently than other known solutions. BRITAX has provided children's car seats with what they call "True Side Impact Technology" to address side impact issues. The "True Side Impact Technology" is said to incorporate deeper side walls on the seat and energy absorbing foam directly over the hard plastic surfaces of both the seat and the headrest. The deeper side walls are said to provide greater surface area for the side impact zone foam protection and the foam is said to absorb energy during impact.

All of the aforementioned solutions either provide only limited improvement to side impact zone protection, are costly to manufacture and implement, or both. Some solutions still result in the seat occupant's head ultimately bottoming out against a hard, unforgiving surface of the seat structure. Alternatively, some solutions are cost prohibitive and structurally complex so as to affect cost competitiveness of the car seat in the marketplace.

SUMMARY

In one example according to the teachings of the present invention, a child car seat is disclosed and has a substantially rigid seat shell with a seating surface side. The shell has a seat bottom section, a seat back section, and two side wings laterally spaced apart and protruding forward relative to an upper region of the seat back section. A support layer of substantially rigid foam is positioned over at least the seating surface side of the side wings. A body of compressible resilient foam material is positioned adjacent the support layer on at least the side wings. The body has an outer surface that is substantially sealed. One or more air passages are in fluid communication between an interior within the outer surface of the body and the atmosphere.

In one example, the seat shell can be a molded plastic material. In one example, the seat shell can be a molded polypropylene material.

In one example, the support layer can be formed of a closed cell foam material.

In one example, the support layer can be formed of expanded polystyrene.

In one example, the support layer can be formed of expanded polystyrene having a density of between about 1 and about 2 pounds per cubic foot.

In one example, the body can be an open cell polyurethane foam material.

In one example, the body can be an open cell polyurethane foam material with an outer surface that is sealed at least in part by a seal layer of thermoplastic elastomer material.

In one example, the outer surface of the body can be sealed at least in part by a seal layer of thermoplastic elastomer material.

In one example, parts of the outer surface of the body not sealed by a seal layer or otherwise can be sealed against a surface of the support layer.

In one example, the one or more air passages can comprise one or more openings formed through the sealed outer surface of the body.

In one example, a part of the outer surface can be sealed against a surface of the support layer.

In one example, the one or more air passages can extend at least in part from a surface of the support layer and through the support layer.

In one example, the one or more air passages can extend from a surface of and through the support layer and between the support layer and the seating surface side of the seat shell.

In one example, the one or more air passages can extend at least in part between and along the body and a surface of the support layer.

In one example, a portion of the sealed outer surface of the body can be formed so as to be sufficiently porous or leaky to define the one or more air passages.

In one example, the side wings can be an integral part of the seat back section of the seat shell.

In one example, a headrest can be coupled to and vertically movable relative to the upper region of the seat back section of the seat shell.

In one example, the side wings can be provided on a headrest on the upper region of the seat back.

In one example, the side wings can be an integral part of the seat back section.

In one example, a headrest can be coupled to and vertically movable relative to the upper region of the seat back. The headrest can include a substantially rigid substrate with a head support side and two supplemental side wings laterally spaced apart across and protruding forward from the substrate. A supplemental support layer of substantially rigid foam can be positioned over at least the head support side of the supplemental side wings. A supplemental body of compressible resilient foam material can be positioned adjacent the supplemental support layer. The supplemental body can have an outer surface that is substantially sealed. One or more air passages can be in fluid communication between an interior within the outer surface of the supplemental body and the atmosphere.

In one example according to the teachings of the present invention, a child car seat has a substantially rigid seat shell with a seating surface side. The shell is configured having a seat bottom section and a seat back section. A headrest is coupled to and vertically adjustable relative to an upper region of the seat back section. The headrest has a head support side facing away from the seat shell. Two side wings are laterally spaced apart and protruding forward from the headrest. A support layer of substantially rigid foam is positioned over the head support side of the headrest. A body of compressible resilient foam material is positioned over the support layer on at least the side wings. The body has an outer surface that is substantially sealed. One or more air passages are in fluid communication through the outer surface between an interior within the body and an exterior of the outer surface of the body.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

A children's care seat is disclosed herein that employs an improved side impact solution. The disclosed side impact solution works well with various speeds of impact and does not bottom out directly against the hard plastic or other material of the seat shell or headrest shell. The disclosed side impact solution utilizes a support layer of substantially rigid foam over the hard surface of the seat shell, the headrest, if present, or both. The disclosed side impact solution also utilizes a body of resilient foam material that overlies the support layer and that has a substantially sealed outer surface. Air passages are provided that communicate with the interior of the body to control air flow out of the body during an impact. The two different material layers will absorb much, if not all, of the energy during a high speed crash upon impact with a seat occupant's head. The two different material layers will decelerate the head during impact much more gradually or in a more controlled manner than other known side impact solutions. These and other objects, features, and advantages will become apparent upon reading this disclosure.

Figure 1:
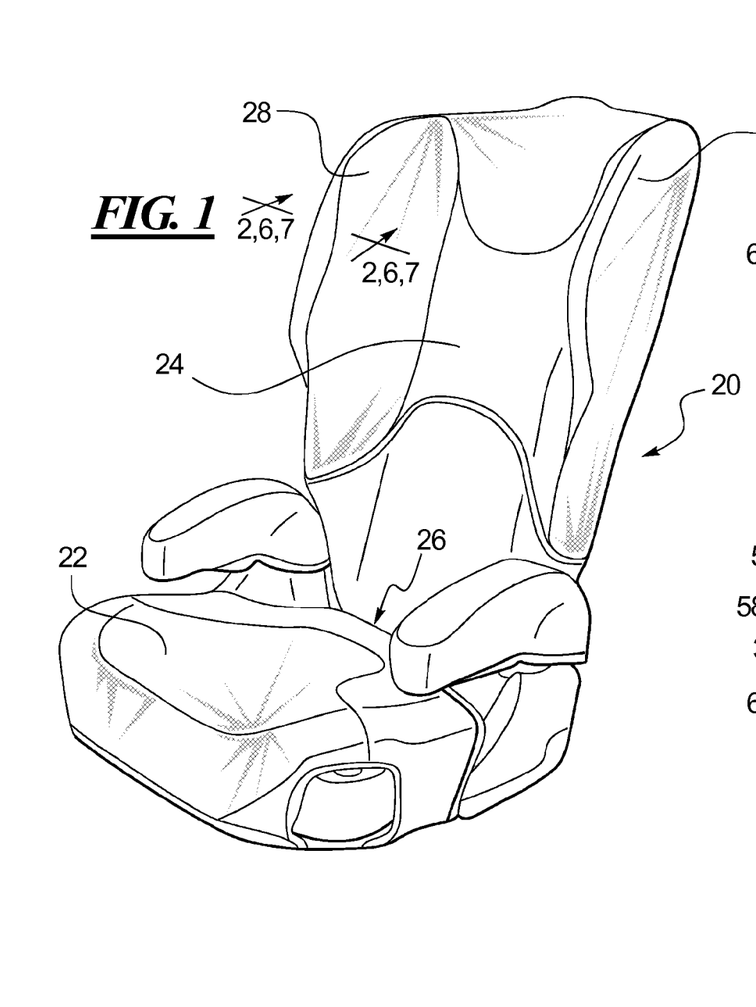
FIG. 1 shows one example of a child car seat constructed in accordance with the teachings of the present invention.

Turning now to the drawings, FIG. 1 shows one example of a child car seat or safety seat 20 constructed in accordance with the teachings of the present invention. In this example, the car seat 20 has a seat bottom 22 joined to a seat back 24 at a seat bight region 26 along the back edge of the seat bottom and the bottom edge of the seat back. The seat back 24 in this example has a one-piece seat back construction with no separate head rest. A pair of side wings 28 are integral with and project forward from opposed side edges on an upper region of the seat back 24. The side wings 28 are laterally spaced apart from one another. In a typical car seat, the side wings 28 provide a lateral barrier to prevent violent, excessive travel of the head and neck of the seat occupant during a side impact crash. The height and depth or width of the side wings 28 can vary. The overall construction of the car seat 20 can also vary within the spirit and scope of the present invention.

Figure 2:
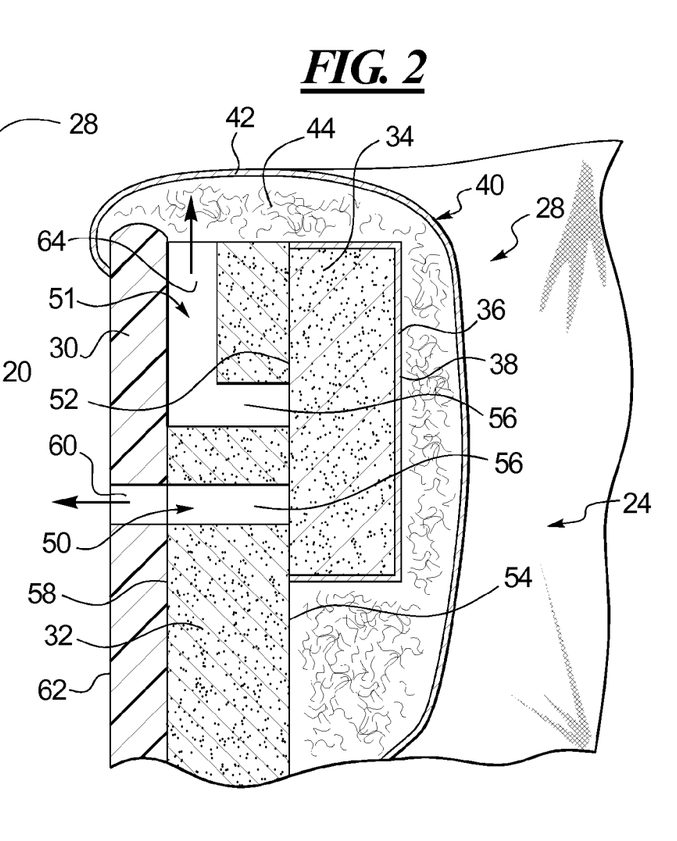
FIG. 2 shows a cross-section taken along line 2-2 of the car seat in FIG. 1.

FIG. 2 shows a cross-section of one of the side wings 28 on the seat back 24. Each side wing 28 defines a side impact energy absorption zone or impact protection zone in accordance with the teachings of the present invention. The seat back 24, and particularly the side wings 28, includes a substantially rigid seat shell wall 30. The shell wall 30 is part of a seat shell, which typically defines the underlying structure of the entire seat 20. In one example, a support layer 32 can overlie the entire seating surface side of the seat shell wall 30, or at least a substantial majority thereof. The support layer 32 can be provided to improve the comfort of the seat occupant so that they do not have to sit directly on the hard, substantially rigid material of the shell wall 30. The support layer 32 can also provide energy absorption, as discussed below, upon impact in the event of a crash or other sudden impact or movement of the seat occupant against the support layer.

In one example, the support layer 32 can be formed of a rigid foam material applied to the seat shell wall 30. The support layer can be molded or formed to the shape of the seating surface of the shell wall 30 and then adhered to the wall using an adhesive or other suitable mechanism. In one particular example, the support layer 32 can be closed cell foam, such as an expanded polystyrene (EPS) foam material. In one specific example, the EPS foam material of the support layer 32 can be a 1.5 lb. density EPS foam material that is shaped to cover the seat shell wall 30. Different foam materials having suitable properties and different density EPS foam materials can be provided as the support layer 32 and may perform generally as intended.

In the disclosed example, at least the side wings 28 of the car seat 20 can be formed as a side impact energy absorbing or protection zone. However, other portions of the car seat 20 can also be formed having such characteristics, if desired. According to one aspect of the invention, each side wing 28 in this example includes a second layer or body 34 of a compressible, resilient material overlying the material of the support layer 32. In one example, the body 34 can be formed of an open cell foam material. In one particular example, the body can be formed of a urethane foam material that is open cell, compressible, and resilient so that it will return to its original shape upon release of a force that compresses the material.

In the disclosed example, at least a substantial majority of an outer surface 36 of the body 34 is sealed to close off or encapsulate the open cell nature of the foam material. This defines an interior comprised of the resilient, compressible material of the body 34 within the substantially sealed outer surface. Limited portions of the outer surface 36 may not be sealed for reasons described below. As shown in FIG. 2, any portion of the outer surface 36 of the body 34 that lies against the support layer 32 may also remain unsealed, if desired. This is because the support layer 36 will seal this portion of the outer surface 36 of the body 34. However, it is certainly possible and within the spirit and scope of the invention that this portion of the outer surface also be sealed.

In one example, the outer surface 36 of the body 34 can be sealed by a sealing layer 38 of thermoplastic elastomer (TPE) urethane foam sealer. In other examples, the sealing layer 38 can be formed by other suitable materials, surface treatments, films, processes, or the like. For example, the outer surface 36 of the compressible, resilient material may be treated using heat, chemicals, or the like to close off or encapsulate the outer exposed open cells at the outer surface 36 to a depth sufficient to create the sealing layer 38. In another example, the outer surface 36 can be a separate layer of material adhered or bonded to the body 34 or simply overlying and encapsulating the body. Such a material layer could be a continuous layer of material or two or more sheets that are sewn, bonded, heat welded, chemically welded, or otherwise connected together.

As is known in the art, the entire car seat 20, or at least the seating surface side of the seat, can be covered by a soft goods layer 40. The soft goods layer 40 can include sub-layers such as a fabric material 42 and a light padding 44, foam, wadding, or the like that underlies part or all of the fabric layer. The soft goods layer 40 can also include additional sub-layers of material, as desired. The soft goods layer 40 can be provided for altering the aesthetic appearance of the car seat, improving the comfort of the seat occupant, or both. The configuration and construction of the soft goods layer 40 can vary considerably within the spirit and scope of the present invention.

In the disclosed example, one or more air ports or passages 50, 51 can be provided within the energy absorbing safety zones or impact protection zones. The ports or passages 50, 51 can be configured to allow air to escape from within the interior of the compressible, resilient material of the body 34 when the body is compressed. The one or more air ports or passages 50, 51 can be configured to allow air to escape in a predetermined and controlled manner from the interior of the body 34. In this example, two different air port or passage constructions are illustrated and either one or both types can be utilized in the same car seat 20, as desired. In this example, a back portion 52 of the outer surface 36 on the body 34 lies directly against an exterior surface 54 of the support layer 32. The body 34 and support layer 32 can be mechanically connected or adhered to one another in any suitable manner, such as by utilizing an adhesive, chemical bonding, heat welding, or the like. Each type of air port or passage 50, 51 in this example allows air to escape the interior of the body 34 through the support layer 32.

The one or more air ports or passages 50, 51 can include a bore 56 formed through the thickness of the support layer 32 from the exterior surface 54 to a back surface 58 that lies against the shell wall 30. In one example, the port or passage 50 can include a hole 60 or perforation formed through the shell wall 30 in aligned communication with the bore 56. The hole 60 can exhaust air to the atmosphere on a back side 62 of the seat back 24. In another example, the port or passage 51 can include a channel 64 formed along the back surface 58 of the support layer 32 in aligned communication with the bore 56. The channel 64 can extend to a side or top edge of the shell wall 30 or otherwise communicate with the atmosphere. Each of the one or more air ports or passages 50, 51 in this example allows air to exit or escape the interior of the body 34 to the atmosphere when the body is compressed. The same ports or passages can allow air to refill the interior of the body when a compression force on the body is released. The resilience of the compressible material of the body 34 will then return the body to its natural, uncompressed shape.

During normal use, a seat occupant may move or rest their head against either of the side wings 28. The body 34 will provide excellent comfort for the occupant because the resilient, compressible material will provide a soft, forgiving surface that will only slightly or partially compress and absorb energy upon head contact. The ports or passages 50, 51 will allow the body 34 to compress and expand as needed under normal use conditions without fully compressing and bottoming out against the support layer.

Similarly, during a relatively low speed or low energy side impact crash, a seat occupant's head will strike one of the side wings 28. The body 34 will absorb and dissipate energy upon the occupant's head impacting the side wing 28. The body 34 will decelerate the occupant's head in a controlled manner, stopping head movement before the body 34 bottoms out against the support layer 32. During a relatively high speed or high energy side impact crash, a seat occupant's head will again strike or impact one of the side wings 28. The body 34 will again absorb and dissipate much of the energy from impact. Compression of the body 34 will significantly decelerate the occupant's head until the body 34 bottoms out against the support layer 32. The air held within the interior of the body 34 will escape via the air ports or passages 50, 51, which will allow the body to collapse, but slow its collapse by limiting the volume of air per unit time to exit the body The occupant's head and the fully compressed body 34 will then impact the support layer 32. The support layer 32 is a substantially rigid foam material, which will partially crush under a significant enough load or impact. The support layer 32 will thus further decelerate the occupant's head in a relatively controlled manner over the thickness of the support layer, absorbing additional energy.

The disclosed impact protection zones or energy absorbing zones significantly improve crash safety. The zones each have two distinct layers of energy absorbing material over the hard or substantially rigid and unforgiving material of the shell wall 30. Each layer is capable of significant energy absorption. The two materials layers in combination significantly dissipate energy upon impact and decelerate movement of the occupant's head over the entire thickness of the two layers.

Figure 3:
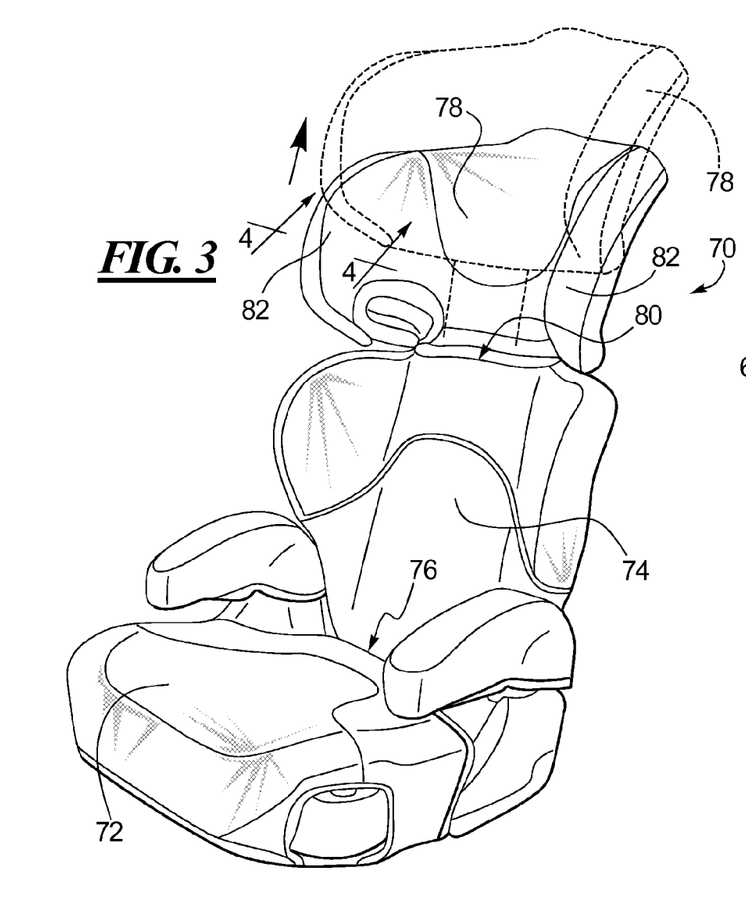
FIG. 3 shows another example of a car seat constructed in accordance with the teachings of the present invention.
Figure 4:
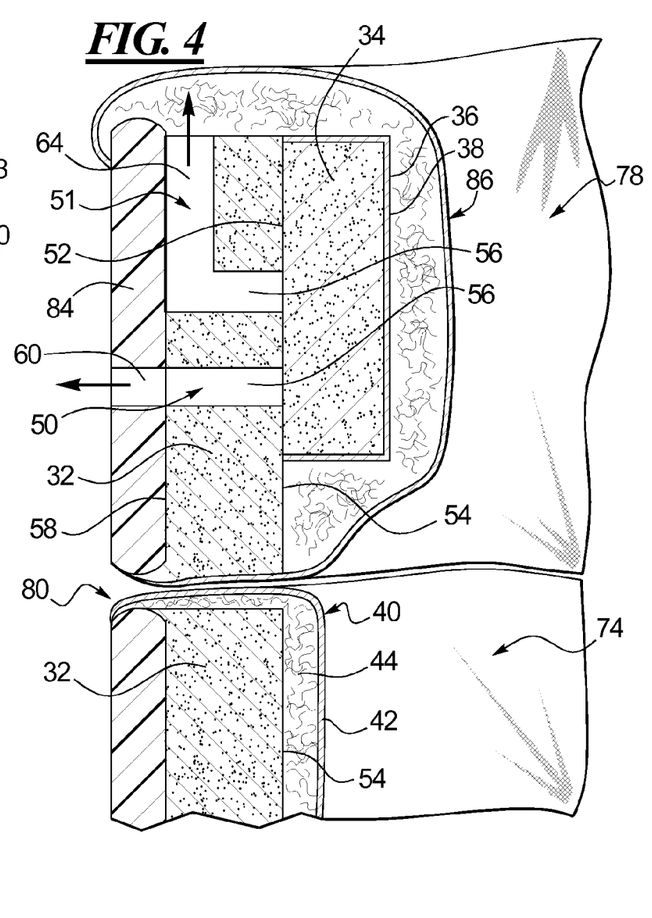
FIG. 4 shows a cross-section taken along line 4-4 of the car seat show in FIG. 3.

FIGS. 3 and 4 illustrate another example of a car seat 70 constructed in accordance with the teachings of the present invention. In this example, the car seat 70 again has a seat bottom 72 joined to a seat back 74 at a seat bight region 76. The seat back 74 in this example has a two-piece seat back construction with a separate head rest 78 coupled to a top end 80 of the seat back 74. A pair of side wings 82 is integral with and projects forward from opposed side edges of the head rest 78 in this example, not the from seat back itself. The side wings 82 are again laterally spaced apart from one another. In a typical car seat of this type, the head rest 78 and side wings 82 are vertically adjustable to accommodate seat occupants of different height. The head rest 78 is shown in FIG. 3 in a lowered position and is shown in phantom in a raised position. The side wings 82 on the head rest 78 in this example still provide a lateral barrier to prevent violent, excessive travel of the head and neck of the seat occupant during a side impact crash. The height, width, and depth of the head rest 78 and the integral side wings 82 can vary. The overall construction of the car seat 70 can also vary within the spirit and scope of the present invention.

FIG. 4 shows a cross-section of one of the side wings 82 on the head rest 78. Each side wing 82 defines the side impact energy absorption zone or impact protection zone in accordance with the teachings of the present invention. The side wings 82 on the head rest 78 are essentially identical to the side wings 28 on the seat back 24 described above, with like reference numbers revealing like parts. The only differences in this example are that the head rest 78 has a substantially rigid base or support structure 84 that carries the support layer 32 and body 34, instead of the shell wall 30 and has a separate soft goods layer 86 covering the head rest. The energy absorbing or impact protection zones of the head rest 78 otherwise function in the same manner as described above with respect to the side wings 28 on the seat back 24.

Portions of, or all of, the seat back 74 below the head rest can be constructed with energy absorbing impact zones or impact protection zones as well, if desired. However, in this example, the seat back 74 has only the shell wall, the support layer 32, and the soft goods layer 40, similar to the earlier described seat back 24 below the side wings 28.

Figure 5:
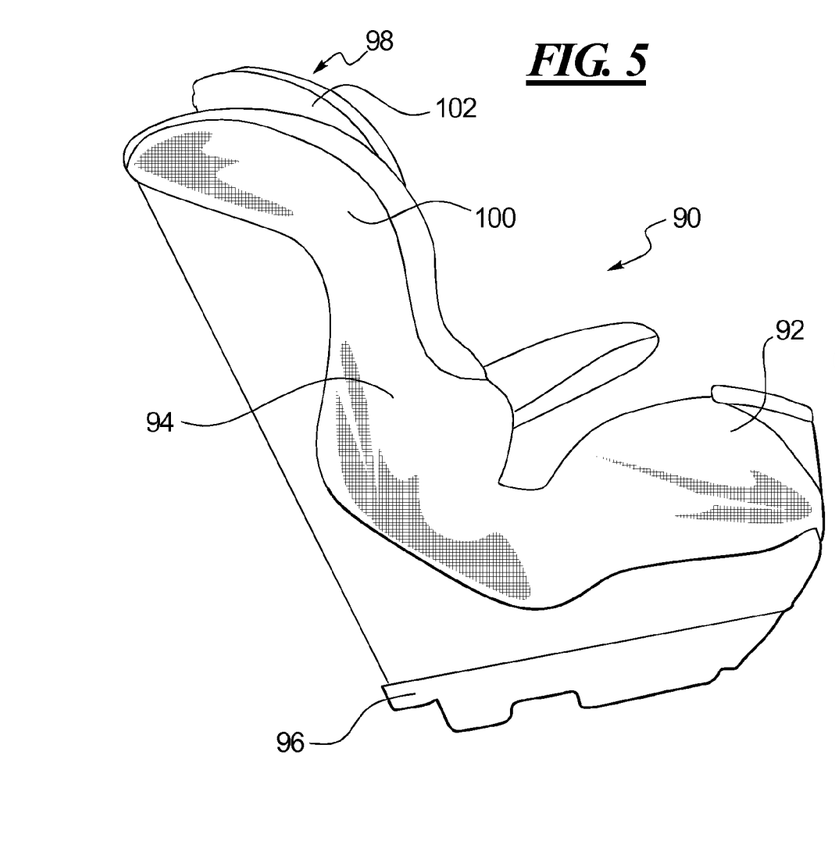
FIG. 5 shows yet another example of a car seat constructed in accordance with the teachings of the present invention.

FIG. 5 shows another example of a child car seat 90 also constructed in accordance with the teachings of the present invention. In this example, the car seat 90 has a seat bottom 92, a seat back 94, a seat base 96, and a head rest 98 movably coupled to the upper region of the seat back. The type of car seat shown in FIG. 5 can be reconfigurable between a rear facing infant seat orientation (with base), a forward facing infant and toddler seat orientation (with base), and a booster arrangement (without base). On this type of car seat 90, both the seat back 94 and head rest 98 can define distinct side wings 100, 102, respectively. In the infant and toddler orientations, the head rest 98 may lie directly over the upper region of the seat back 94. The seat occupant's head would typically be between the side wings 102 of the head rest 98. The head rest 98 can be adjusted upward beyond the top end of the seat back 94 for larger children. The head rest 98 may also be completely removable from the seat back 94 if the seat 90 is convertible to a booster seat with both the base and the head rest. As a result, both the side wings 102 on the head rest 98 and the side wings 100 on the seat back 94 can include the disclosed energy absorbing side impact zones or side impact protection zones as described previously. The side wings 100 could include the structure depicted in FIG. 2 and the side wings 102 could include the structure depicted in FIG. 4. Alternatively, it is possible that only one of the side wings 100 or 102 include the energy absorbing zones disclosed herein.

Figure 6:
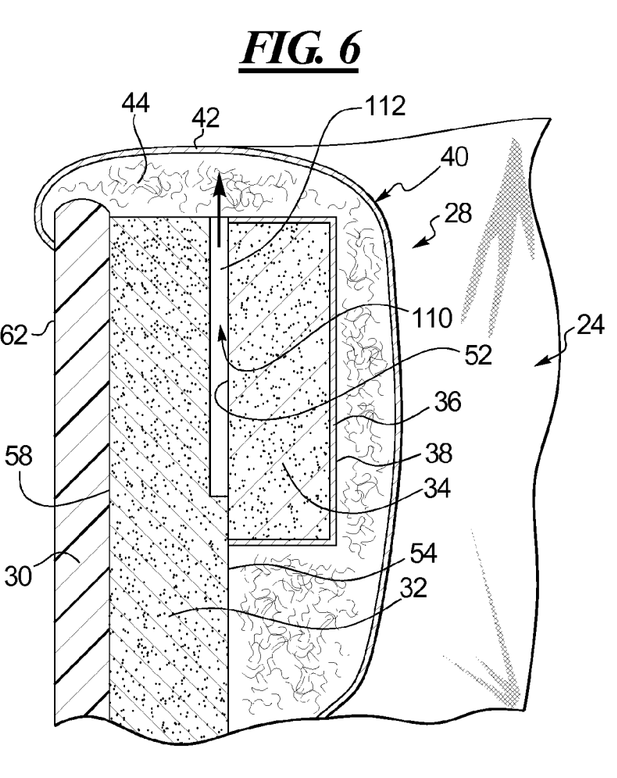
FIG. 6 shows a cross-section, similar to that of FIG. 1, but of another example of a car seat constructed in accordance with the teachings of the present invention.

FIG. 6 is similar to FIG. 2, but shows an alternate air port or passage construction for the side impact zone feature. Again, like reference numbers in the drawings reveal like parts among the different embodiments. In this example, a car seat may have a molded plastic shell wall 30, an EPS 1.5 lb. foam support layer 32, a body 34 of resilient, compressible material, and a soft goods layer 40. The difference in this example is that one or more air ports or passages 110 are formed as channels between the support layer 32 and the body 34. The channels 112 can be formed as recesses in the back portion 52 of the body 34, in the exposed exterior surface 54 of the support layer 32, or both. In any case, the channels will communicate with the interior, open cell material of the body 34 and vent or exhaust to atmosphere at edges of the side wing or seat structure. The one or more air ports or passages 110 and channels 112 can be formed as linear channels or nonlinear, curved channels as desired. Providing the channels as relatively lengthy and/or circuitous elements may likely aid in creating a desired, controlled exhausting of air from the body. The diameter or size of the channels may also have the same desired effect.

Figure 7:
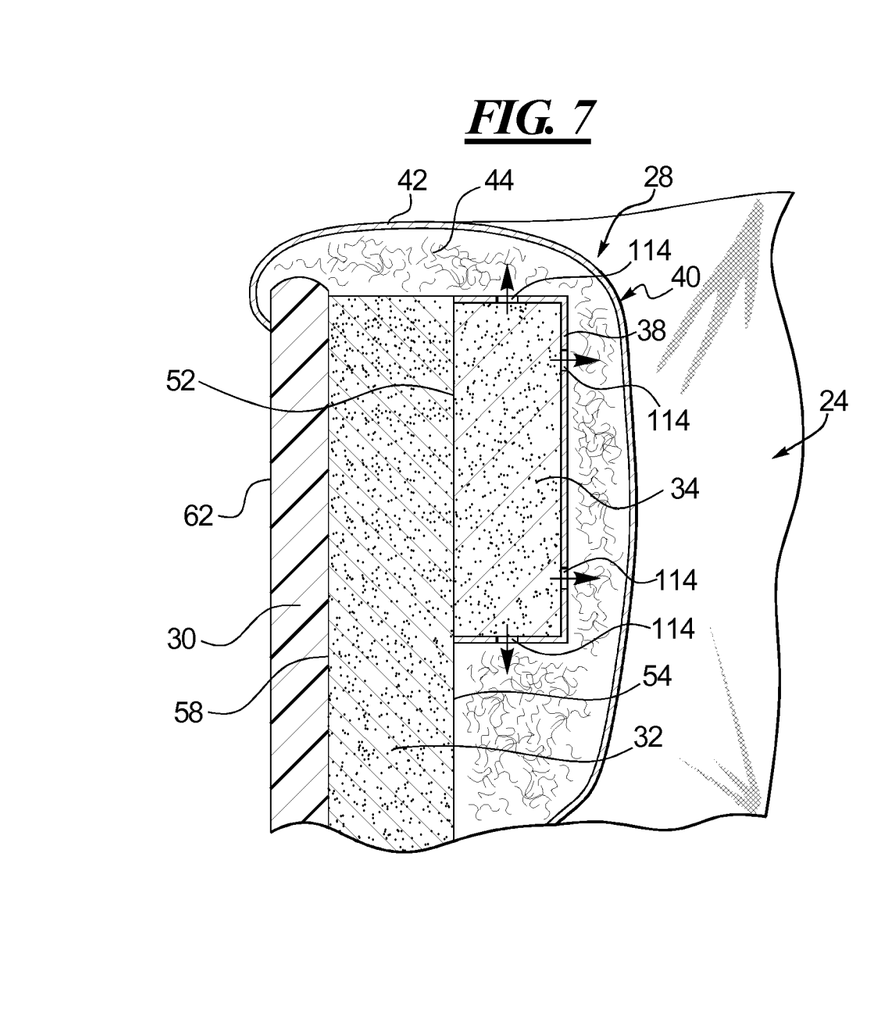
FIG. 7 shows a cross-section, similar to that of FIG. 6, but of another example of a car seat constructed in accordance with the teachings of the present invention.

FIG. 7 is similar to FIGS. 2 and 6, but shows another alternate air port or passage construction for the side impact zone feature. Again, like reference numbers in the drawings reveal like parts among the different embodiments. In this example, a car seat may again have a molded plastic shell wall 30, an EPS 1.5 lb. foam support layer 32, a body 34 of resilient, compressible material, and a soft goods layer 40. The difference in this example is that one or more air ports or passages 110 are formed as openings 114, perforations, holes, or the like through the sealing layer 38 that surrounds the exposed portions (portions not lying against the support layer 32) on the outer surface 36 of the body 34. The number, size, and spacing of the openings 114 can be altered to achieve the desired air exhaust characteristics for the body 34 in this example.

In other embodiments similar to FIG. 7, but not shown herein, the openings 114 can be formed through a separate film or material layer that defines the sealing layer 38 and surrounds the body 34. In another example, the openings 114 can be formed as holes or perforations in a skin layer that is formed on the outer surface 36 and defines the sealing layer 38. In yet another example, if the sealing layer is formed of two or more sheets of materials that are joined together, the openings 114 can be formed in those joints or may just results from a lousy or leaky seal at such joints.

The air ports and passages in the above-described examples can vary within the spirit and scope of the present invention. The number of ports or passages can vary from one in each side impact zone to multiple ports or passages in each zone. The cross-sectional shape and size of the ports can also vary from round, to oval, square, rectangular, elliptical, polygonal, or the like. The positioning and arrangement of the ports or passages can also vary and yet function as intended to allow air to escape and reenter the interior of the compressible, resilient bodies 34 in the energy absorbing side impact zones or side impact protection zones.

Figure 8:
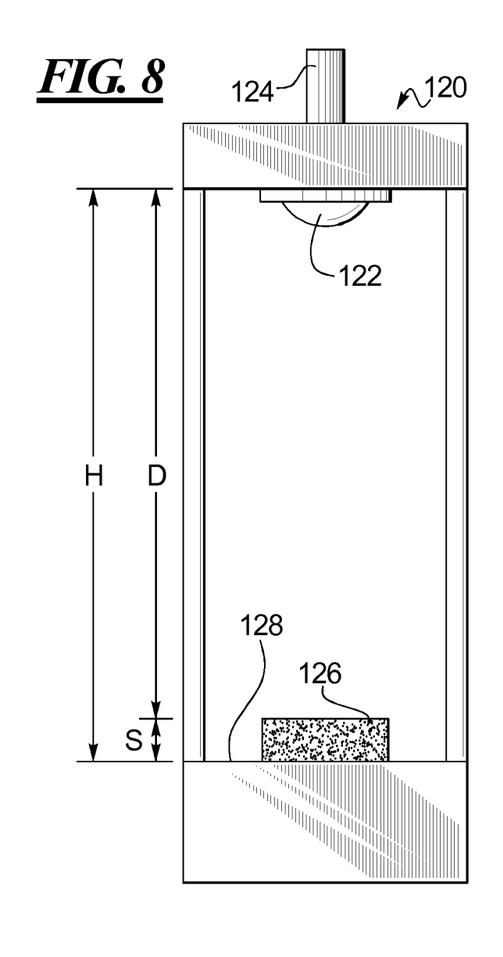
FIG. 8 shows a schematic of a drop test apparatus used to test various materials and arrangements for energy absorption upon impact.

The disclosed side impact zones were tested to determine their effectiveness in absorbing energy when contacted of impacted by an object. FIG. 8 shows a simplified schematic of a drop testing device 120 utilized to compare various materials and solutions for with respect to energy absorption. The testing device is known in the art and is not described in detail herein. However, the device 120 generally included an impactor 122 and an accelerometer 124 to measure acceleration/deceleration of the impactor. During testing, the impactor 122 was elevated and then dropped onto each specimen 126 to be tested within the device 120 and supported on a platform 128. In the example tests, the impactor had a mass of 7.31 lbs. or 3.31 kg. The specimens 126 that were tested had thickness S of about 15 to about 20 mm. The total drop height H of the impactor 122 to the platform 128 was varied to achieve different desired drop speeds. This height H included a variable drop distance D to the top of each specimen 126. Basic assumptions were made during testing, including that the effects of friction within the device 120 were neglected and gravity was assumed to be 9.8 m/s$^2$.

Ultimately, the device 120 was used to determine the g-force experienced by the impactor 122 when impacting various material specimens 126. The tests were thus used to simulate the G-force that a seat occupant's head might experience during a crash if it were to impact a car seat surface constructed in the form of the test specimen.

Figure 9:
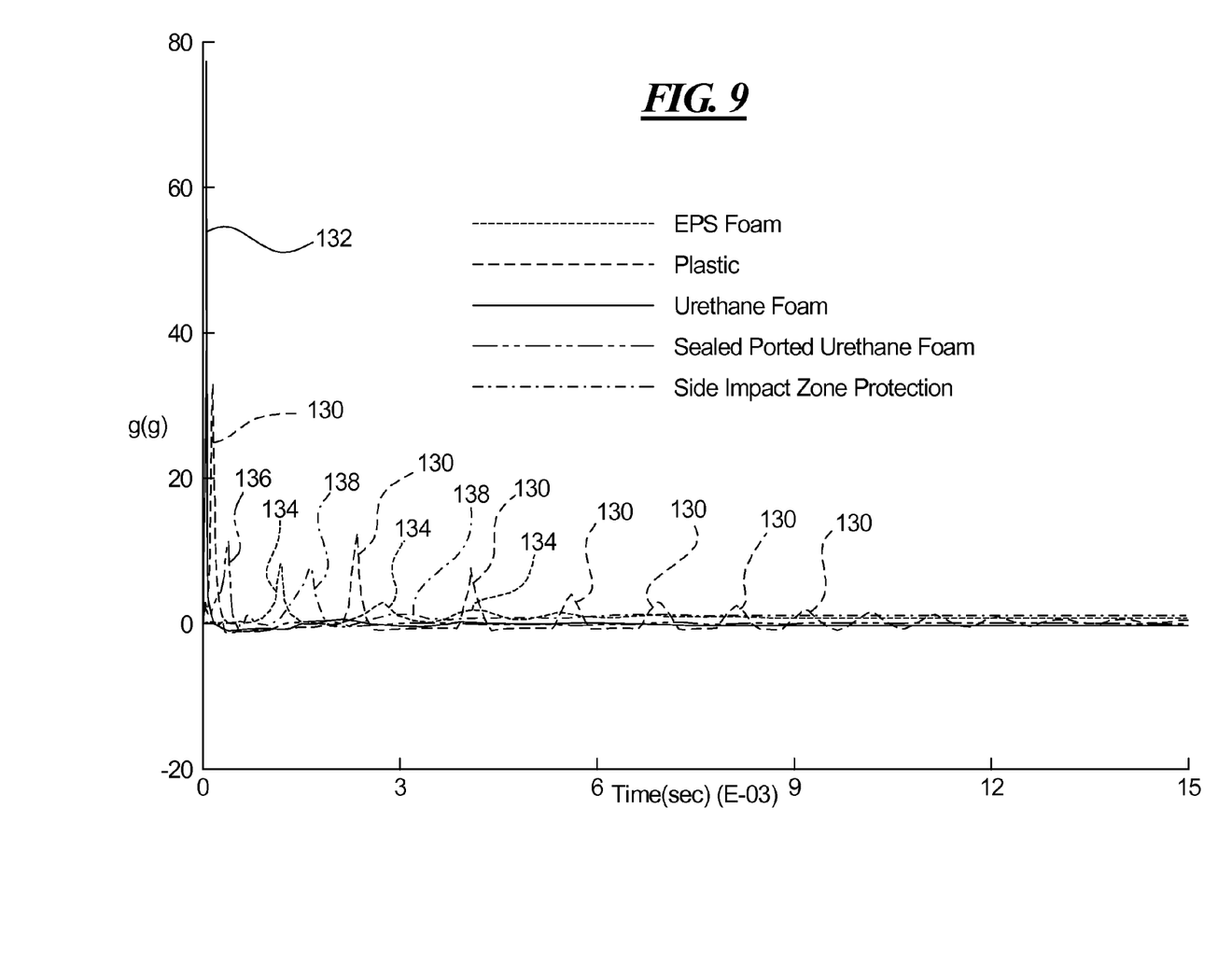
FIG. 9 shows a graph comparing low acceleration energy absorption for various materials.

FIG. 9 illustrates one example of baseline test results for different materials or specimens 126 using only a low drop speed of 3.15 mph. In this example, a basic specimen of plastic was tested to simulate the car seat shell wall with no other protection. Line 130 represents the tests results for the plastic specimen. Plastic produced a nearly immediate spike of about 33 g-force (hereinafter "g's") upon initial impact of the impactor 122 and also produced significant bounce or multiple secondary impacts after the first impact with secondary spikes of about 12 g's, 8 g's, and so on. Thus, the plastic specimen yielded only minimal energy absorption upon initial impact and then produced multiple secondary impacts after the first as a result of bounce.

A specimen of open cell urethane foam was also tested and the test results are indicated by line 132 in FIG. 9. The urethane foam specimen produced a large, nearly immediate spike of close to 80 g's upon initial impact. The urethane foam specimen then produced very little bounce or secondary impacts after the initial impact. The high initial spike for the urethane foam and plastic specimens shows that both specimens bottomed out before the specimens absorbed any significant amount of energy of the initial impact.

A specimen of closed cell EPS 1.5 lb. foam was also tested and the results are indicated by line 134 in FIG. 9. The EPS foam specimen absorbed significant energy upon initial impact at the low drop speed. The specimen produced a spike of about 8.5 g's at about 1.2 seconds after initial impact. The specimen then produced some bounce resulting in two small secondary spikes of 1.5 to 3 g's.

A specimen including a sealed and ported urethane foam material was tested to simulate the Dorel/Cosco AIRPPROTECT technology noted above. The test results for this specimen are indicated by line 136 in FIG. 9. This specimen produced a spike of about 11 g's at about 0.75 seconds after initial impact and then minimal to no bounce thereafter. This specimen performed only slightly less effectively upon initial impact than the EPS foam specimen noted above.

A specimen including the side impact zone protection structure of the example noted above in FIG. 2 was also tested. The results are indicated at line 138 in FIG. 9. This specimen produced a spike of about 7 g's at about 1.6 seconds after initial impact and then a very small single bounce or secondary spike of about 2 g's at about 4.5 seconds after initial impact. Thus, the specimen constructed according to the teachings of the present invention absorbed significant energy of the initial impact and produced only very minimal bounce. These test results show that, at least at a relatively low drop speed of 3.15 mph, the side impact zone protection of this disclosure provides superior energy absorption to the other specimens, all of which can be found on one or more car seats available in the marketplace.

Figure 10:
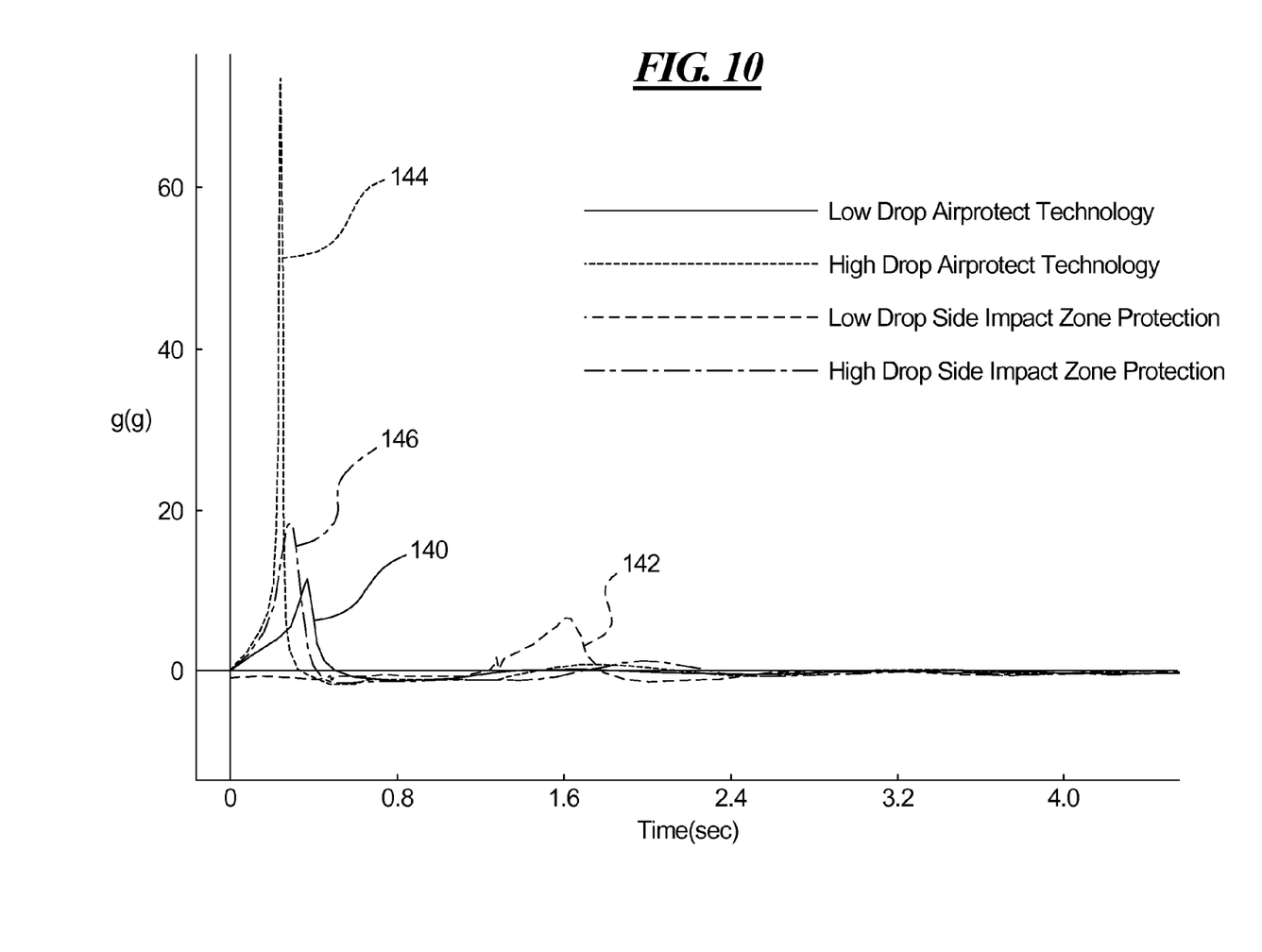
FIG. 10 shows a graph comparing low and high acceleration energy absorption of a prior art car seat to the car seats disclosed herein.

FIG. 10 illustrates one example of a particular comparison test between the side impact zone protection and the Dorel/Cosco AIRPROTECT Technology. In this example, both specimens were subjected to the low speed drop of 3.15 mph and also to a high speed drop of 4.91 mph upon initial impact. As can be seen, both specimens exhibited significant energy absorption at the low speed drop. The AIRPROTECT specimen low speed test results are indicated by line 140 in FIG. 10. The specimen produced about 11 g's at about 0.4 seconds after initial impact by the impactor 122. The side impact zone protection specimen low speed test results are indicated by line 142. The structure of the invention produced about 7 g's at about 1.6 seconds after initial impact. Neither specimen produced or experienced any significant bounce. The specimen of the invention showed superior energy absorption, though both specimens produced good results.

The side impact zone protection structure of the invention high speed test results are indicated by line 144 in FIG. 10. The specimen produced a spike of about 17.5 g's at about 0.3 seconds after initial impact when subjected to the high speed drop test. This specimen produced one secondary bounce of about 2 g's at about 2 seconds after initial impact. In contrast, the AIRPROTECT specimen produced a significant spike of about 75 g's at about 0.25 seconds after initial impact and a secondary bounce impact of about a 1.5 g's at about 1.8 seconds after initial impact during the high speed drop test. This resulted from the AIRPROTECT specimen bottoming out at the higher drop speed. Thus, the side impact zone protection structure of the invention produced significantly better energy absorption than the known AIRPROTECT Technology specimen at the higher drop speed. The difference in these test results is that the AIRPROTECT Technology bottoms out against the hard plastic shell of the seat when completely compressed. The side impact zone protection structure of the invention bottoms out first against the support layer 32, which in the tested example was EPS 1.5 lb. foam, instead of the hard plastic shell of the seat.

The disclosed energy absorption solution examples utilize a semi-sealed, ported foam body 34 over a support layer of EPS foam. The solution provides very effective energy absorption but is also extremely cost effective. The solution is quite simple to manufacture and utilizes only readily available and well known materials. It is the combination of materials that produces the superior performance of the invention.

As noted above, the disclosed energy absorbing impact zone or side impact protection zone solutions can be employed on different car seat configurations and on different portions of the car seat. The impact zone solutions can also be employed on the seat shell itself, the head rest, or both. Such zones could also be provided on other parts of the car seat, if desired.

Other devices and materials could be utilized for the support layer 32, the resilient body 34, or both. Materials that are capable of absorbing energy can accomplish the desired objective, such as different foam materials, gel, bending or crumpling metal, airbladders, and the like are all known to be capable of absorbing energy. The uniqueness of the disclosed solutions is in the simplicity, cost effectiveness, small packaging, energy absorbing efficiency, and ability to absorb various speed impacts while providing some benefit to the seat occupant. The disclosed solutions utilize common, readily available materials that are already found on existing car seats. The solutions also required little, if any, seat redesign and a minimum number of additional parts compared to existing car seats. The disclosed solutions are simple in their configuration and construction but efficiently and effectively absorb energy resulting from various impacts to the car seat. The foam layers can be configured as needed to fit virtually any car seat part, form, shape, or contour.

Although certain car seats and side impact protection zones or energy absorbing impact zones for car seats have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A child car seat comprising:
   a substantially rigid seat shell having a seating surface side and having a seat bottom section, a seat back section, and two side wings laterally spaced apart and protruding forward relative to an upper region of the seat back section;
   a support layer of a substantially rigid foam positioned over at least the seating surface side of the side wings;
   a body of compressible resilient foam material adjacent the support layer on at least the side wings, the body having an outer surface that is substantially sealed; and
   one or more air passages in fluid communication between an interior within the outer surface of the body and the atmosphere,
   wherein the outer surface of the body is sealed at least in part by a seal layer of thermoplastic elastomer material, and wherein parts of the outer surface of the body not sealed by the seal layer are sealed against a surface of the support layer.

2. A child car seat according to claim 1, wherein the seat shell is a molded plastic material.

3. A child car seat according to claim 1, wherein the seat shell is a molded polypropylene material.

4. A child car seat according to claim 1, wherein the support layer is formed of a closed cell foam material.

5. A child car seat according to claim 1, wherein the one or more air passages comprise one or more openings formed through the sealed outer surface of the body.

6. A child car seat according to claim 1, wherein a portion of the sealed outer surface of the body is formed so as to be sufficiently porous or leaky to define the one or more air passages.

7. A child car seat according to claim 1, wherein the side wings are an integral part of the seat back section of the seat shell.

8. A child car seat according to claim 1, wherein the support layer is formed of expanded polystyrene.

9. A child car seat according to claim 8, wherein the expanded polystyrene has a density of between about 1 and about 2 pounds per cubic foot.

10. A child car seat according to claim 1, wherein the body is an open cell polyurethane foam material.

11. A child car seat according to claim 10, wherein the outer surface of the open cell polyurethane foam material is sealed at least in part by a seal layer of thermoplastic elastomer material.

12. A child car seat according to claim 1, further comprising:
    a headrest coupled to and vertically movable relative to the upper region of the seat back section of the seat shell.

13. A child car seat according to claim 12, wherein the side wings are on the headrest.

14. A child car seat according to claim 12, wherein the side wings are an integral part of the seat back section, and wherein the headrest further comprises:
    a substantially rigid substrate with a head support side and two supplemental side wings laterally spaced apart across and protruding forward from the substrate;
    a supplemental support layer of a substantially rigid foam positioned over at least the head support side of the supplemental side wings;
    a supplemental body of compressible resilient foam material adjacent the supplemental support layer, the supplemental body having an outer surface that is substantially sealed; and
    one or more air passages in fluid communication between an interior within the outer surface of the supplemental body and the atmosphere.

15. A child car seat comprising:
    a substantially rigid seat shell having a seating surface side and having a seat bottom section, a seat back section, and two side wings laterally spaced apart and protruding forward relative to an upper region of the seat back section;
    a support layer of a substantially rigid foam positioned over at least the seating surface side of the side wings;
    a body of compressible resilient foam material adjacent the support layer on at least the side wings, the body having an outer surface that is substantially sealed; and
    one or more air passages in fluid communication between an interior within the outer surface of the body and the atmosphere,
    wherein a part of the outer surface is sealed against a surface of the support layer, and wherein the one or more air passages extend at least in part between and along the body and the surface of the support layer.

16. A child car seat comprising:
    a substantially rigid seat shell having a seating surface side and configured having a seat bottom section and a seat back section;
    a headrest coupled to and vertically adjustable relative to an upper region of the seat back section, the headrest having a head support side facing away from the seat shell;
    two side wings laterally spaced apart and protruding forward from the headrest;
    a support layer of a substantially rigid foam positioned over the head support side of the headrest;
    a body of compressible resilient foam material over the support layer on at least the side wings, the body having an outer surface that is substantially sealed; and
    one or more air passages in fluid communication through the outer surface between an interior within the body and an exterior of the outer surface of the body,
    wherein the outer surface of the body is sealed at least in part by a seal layer of thermoplastic elastomer material, and wherein parts of the outer surface of the body not sealed by the seal layer are sealed against a surface of the support layer.

17. A child car seat comprising:
    a substantially rigid seat shell having a seating surface side and having a seat bottom section, a seat back section, and two side wings laterally spaced apart and protruding forward relative to an upper region of the seat back section;
    a support layer of a substantially rigid foam positioned over at least the seating surface side of the side wings;
    a body of compressible resilient foam material adjacent the support layer on at least the side wings, the body having an outer surface that is substantially sealed; and
    one or more air passages in fluid communication between an interior within the outer surface of the body and the atmosphere,
    wherein a part of the outer surface is sealed against a surface of the support layer, and wherein the one or more air passages extend at least in part from the surface of the support layer and through the support layer.

18. A child car seat according to claim 17, wherein the one or more air passages extend from the surface of and through the support layer and between the support layer and the seating surface side of the seat shell.

* * * * *